United States Patent [19]

Scheps

[11] Patent Number: 5,412,674
[45] Date of Patent: May 2, 1995

[54] COMPACT RAPIDLY MODULATABLE DIODE-PUMPED VISIBLE LASER

[75] Inventor: Richard Scheps, Del Mar, Calif.

[73] Assignee: The United States of America as represented by the Secretary of the Navy, Washington, D.C.

[21] Appl. No.: 225,845

[22] Filed: Apr. 7, 1994

Related U.S. Application Data

[63] Continuation-in-part of Ser. No. 108,131, Aug. 12, 1993, Pat. No. 5,333,142, and a continuation-in-part of Ser. No. 183,212, Jan. 14, 1994.

[51] Int. Cl.$^6$ .......................................... H01S 3/109
[52] U.S. Cl. .................................. 372/22; 359/326; 372/23
[58] Field of Search .................. 372/20–23; 359/326, 330

[56] References Cited

U.S. PATENT DOCUMENTS

| | | | |
|---|---|---|---|
| 3,731,110 | 5/1973 | Dewey, Jr. | 372/21 X |
| 4,791,631 | 12/1988 | Baumert et al. | 372/22 |
| 4,837,769 | 6/1989 | Chandra et al. | 372/41 |
| 4,866,720 | 9/1989 | Holly | 372/23 |
| 4,872,177 | 10/1989 | Baer et al. | 372/75 |
| 4,879,723 | 11/1989 | Dixon et al. | 372/21 |
| 4,933,944 | 6/1990 | McGraw | 372/22 X |
| 4,935,931 | 6/1990 | McGraw | 372/22 X |
| 4,956,843 | 9/1990 | Akhavan-Leilabady et al. | 372/23 |
| 5,038,352 | 8/1991 | Lenth et al. | 372/21 |
| 5,060,233 | 10/1991 | Harder et al. | 372/22 |
| 5,067,134 | 11/1991 | Oomen | 372/6 |
| 5,095,491 | 3/1992 | Kozlovsky et al. | 372/21 X |
| 5,142,542 | 8/1992 | Dixon | 372/22 |
| 5,260,953 | 11/1993 | Rowe | 372/20 |
| 5,276,695 | 1/1994 | Scheps | 372/20 |

OTHER PUBLICATIONS

D. W. Anthon et al., "Nd:YAG-Diode Laser Summation in KTP for a High Modulation Rate Blue Laser", *SPIE, Miniature Optics and Lasers*, vol. 898, pp. 68–69, 1988.

W. P. Risk et al., "Generation of Blue Light by Intracavity Frequency Mixing of the Laser and Pump Radiation of a Miniature Neodymium:yttrium Aluminum Garnet Laser", *Appl. Phys. Lett.*, vol. 52, No. 2, 11 Jan. 1988, pp. 85–87.

(List continued on next page.)

*Primary Examiner*—John D. Lee
*Attorney, Agent, or Firm*—Harvey Fendelman; Thomas Glenn Keough

[57] ABSTRACT

An apparatus for producing rapidly modulated coherent optical emission is described in which a doubly resonant cavity produces amplitude modulated sum frequency generation. The configuration of the resonator provides a region where both fundamental wavelengths are overlapped and another region where both fundamental wavelengths are spatially distinct. The resonator further contains a laser gain element in the other region where the wavelengths are spatially distinct to produce one of the two fundamental resonant wavelengths. A laser source injects a signal into the resonator at the other resonant wavelength. The injected wavelength is at or near a wavelength for which the laser gain element can be optically pumped. In one embodiment, one laser both injects a signal into the resonator and simultaneously pumps the laser gain element contained within the resonator cavity. The resonator further contains a nonlinear crystal for intracavity sum frequency generation of the two fundamental wavelengths. By amplitude modulation of the injected signal, an amplitude modulated sum frequency generated signal is produced. Sum frequency generation at 439 nm is described in a noncritically phase matched Type II KTP crystal by simultaneously resonating the cavity at 1.318 $\mu$m and 659 nm.

48 Claims, 3 Drawing Sheets

OTHER PUBLICATIONS

W. P. Risk et al, "Diode Laser Pumped Blue-light Source Based on Intracavity Sum Frequency Generation", *Appl. Phys. Lett.*, vol. 54, No. 9, 27 Feb. 1989, pp. 789–791.

P. N. Kean et al, "Efficient Sum-frequency Upconversion in a Resonantly Pumped Nd:YAG Laser", *Optics Letters*, vol. 17, No. 2, 15 Jan. 1992, pp. 127–129.

W. P. Risk et al., "Efficient Generation of Blue Light by Doubly Resonant Sum-frequency Mixing in a Monolithic KTP Resonator", *Optics Letters*, vol. 17, No. 10, 15 May 1992, pp. 707–709.

J. C. Baumert et al, "Generation of Blue CW Coherent Radiation by Sum Frequency Mixing in $KTiOPO_4$", *Appl. Phys. Lett.*, vol. 51, No. 26, 28 Dec. 1987, pp. 2192–2194.

R. S. Geels et al, "High-Power Visible Semiconductor Lasers", *OELASE '94*.

R. Sheps, "Efficient $Cr,Nd:Gd_3Sc_2Ga_3O_{12}$ Laser at 1.06 $\mu m$ Pumped by Visible GaInP/AlGaInP Laser Diodes", *Appl. Phys. Lett.* vol. 59, No. 11, 9 Sep. 1991, pp. 1287–1289.

G. D. Boyd et al, "Parametric Interaction of Focused Gaussian Light Beams", *Journal of Applied Physics*, vol. 39, No. 8, Jul. 1968, pp. 3597–3639.

COMPACT RAPIDLY MODULATABLE DIODE-PUMPED VISIBLE LASER

STATEMENT OF GOVERNMENT INTEREST

The invention described herein may be manufactured and used by or for the Government of the United States of America for governmental purposes without the payment of any royalties hereon or therefor.

CROSS-REFERENCE TO RELATED APPLICATIONS

This is a continuation in part of U.S. application Ser. No. 08/108,131 filed Aug. 12, 1993 entitled "A Technique for Intracavity Sum Frequency Generation", (now U.S. Pat. No. 5,333,142) and co-pending U.S. patent application Ser. No. 08/183,212 filed Sep. 14, 1994, (now allowed) by Richard Scheps entitled "Intracavity Sum Frequency Generation Using a Tunable Laser Containing an Active Mirror" and incorporates by reference herein all references thereof.

BACKGROUND OF THE INVENTION

The present invention relates to lasers and nonlinear frequency conversion techniques and, particularly, to a technique for producing modulated laser emission by using noncritically phased matched sum frequency generation.

Solid state lasers are a class of lasers which contain a solid state gain element. The gain element generally consists of a host material which can be either a crystalline or amorphous or glass-like material and a dopant or impurity ion distributed within the host material. The dopant ion, which is typically a transition element or a rare earth element, is the primary determinant of the wavelength or wavelengths at which the laser can emit radiation. Typically, solid state lasers operate in the infrared region, that is, between 700 nm and 3 $\mu$.

Trivalent neodymium ($Nd^{3+}$) ions are a commonly used rare earth dopant ion that emits at several wavelengths in the infrared. The exact wavelength of the neodymium laser transitions are dependent on the host material. For the $Nd^{3+}$ host crystal YAG, which is yttrium aluminum garnet and is a commonly used trivalent neodymium host, several emission wavelengths are well-known and are approximately 946 nm, 1.064 $\mu$m, and 1.318 $\mu$m. Typically, the highest gain transition for neodymium ions is the 1.064 $\mu$m transition. The 946 nm transition has a terminal level in a thermally populated Stark level of the ground state and is generally an inefficient laser transition. The 1.318 $\mu$m transition in many trivalent neodymium host materials is much weaker than the 1.064 $\mu$m transition and is therefore both less efficient and is difficult to scale to higher output power. However, in some hosts, most notably $YAlO_3$ (or YALO), the 1.318 $\mu$m stimulated emission cross-section is comparable to that at 1.064 $\mu$m, and it is possible to obtain laser emission at 1.318 $\mu$m with reasonable efficiency and output power.

The host $Gd_3Sc_2Ga_3O_{12}$ or GSGG produces efficient laser output when doped with trivalent neodymium ions. More importantly, when this host material is co-doped with the $Cr^{3+}$ ion, the neodymium transition intensities are not at all effected but the slope efficiency for pumping with broadband radiation increases dramatically. This is a consequence of the broadband absorption of the $Cr^{3+}$ ions and the efficient energy transfer between the $Cr^{3+}$ ions to the trivalent neodymium ions. The energy transfer process results in populating the upper laser level for the $Nd^{3+}$ ions. See, for example R. Scheps *Applied Physics Letters*, vol. 59, p. 1287, 1991.

Co-doped GSGG, or Cr,Nd:GSGG, can be optically pumped over a wide wavelength range. It has an extremely strong peak absorption at approximately 655 nm with an absorption bandwidth of approximately 100 nm. The 1.318 $\mu$m transition in co-doped GSGG can be obtained efficiently, therefore, when pumping in the red wavelength region near 655 nm.

A laser consists of a gain element contained between at least two reflective mirrors. Typically these mirrors are dielectric coatings and may be placed on the gain element itself. The region between the reflective mirrors is termed the laser cavity. Because optical intensity within the cavity is reflected back and forth, the mirrors that bound the laser cavity are sometimes termed a "laser resonator", or a "resonator". In order for light within the laser cavity to reflect between the cavity mirrors without walking out of the resonator it must be contained within a stable resonator mode. The resonator mode is a mathematical description of the spatial distribution of the optical intensity within the resonator.

Much information on resonator modes has been written and appears in basic texts on lasers, see for example A. Siegman, *Lasers*, University Science Books, Mill Valley, 1986. Many different, stable resonator modes can exist in a given resonator. The specific features of the resonator modes are determined by the types and placement of the mirrors that define the laser cavity, and the shape and refractive index of materials contained within the laser cavity, such as the gain element. The mode size typically changes within the laser resonator.

The most desirable stable resonator mode is called the $TEM_{00}$ mode. This mode is the lowest order transverse mode in a stable resonator and is described by a Gaussian intensity distribution. It can be focussed to a small spot size and is therefore desirable for applications such as nonlinear optical conversion. Modes can go through a focus inside the resonator. The focus is called a waist and represents the local minimum in the mode radius. Examples of modes are concentric, hemispherical and confocal.

It is often desirable for numerous applications to use a laser that emits in the visible region of the spectrum. Because of the convenience of the solid state laser gain medium compared to either gaseous or liquid gain media, techniques have evolved to convert the infrared fundamental radiation from the solid state medium to visible radiation. Nonlinear optical conversion is commonly used to produce visible radiation from solid state lasers operating in the infrared. Wavelengths in the blue are of particular interest for applications such as display technology, optical data storage, underwater applications and communications.

Nonlinear optical conversion can occur in a variety of media but is most conveniently effected in a solid state nonlinear crystal. The nonlinear optical conversion process, of which several are known, converts radiation from one wavelength to another. Examples of nonlinear processes: are second harmonic generation, optical parametric oscillation and sum frequency generation (SFG). An important parameter for determining the efficiency by which the nonlinear crystal converts radiation at one wavelength to another is called the phase matching condition. Optimum conversion from the fundamental wavelength to the converted wavelength will occur when the wave vector mismatch between the fundamental wave and the generated wave is zero. This condition is termed "phase matching". Phase matching may be achieved in an anisotropic crystal by a suitable choice of direction of propagation and polarization relative to the crystalline axes.

Two different types of phase matching can occur in crystals. To understand the difference between these two types one must first recognize that the nonlinear process occurs through the interaction of two fundamental waves within the nonlinear medium. For optical parametric oscillation and sum frequency generation, these two waves represent the two fundamental wavelengths. For second harmonic generation, there is only one fundamental wavelength but the two waves that are interacting in the nonlinear medium in this case are distinguished by their polarization. Type I phase matching refers to the process where the two fundamental waves have parallel polarization. Type II phase matching occurs when the fundamental waves have orthogonal polarization.

Phase matching is achieved as a result of the dispersion of the nonlinear crystalline host. Dispersion refers to the dependence of the refractive index of a given material on wavelength. Therefore, a phase matched crystal is one which is phase matched for a specific nonlinear operation. For example, for second harmonic generation in a Nd:YAG laser, the fundamental wavelength at 1.064 μm is converted to 532 nm emission. One requires that the refractive index at 1.064 μm and the refractive index in the same material at 532 nm be such that the phase relationship between the fundamental wavelength and the generated second harmonic wavelength remain unchanged as the two waves propagate along the length of the crystal.

When phase matched second harmonic generation is achieved by propagating the fundamental wavelength along a direction different from a principal axis of a birefringent crystal, it is termed "critical phase matching". When critical phase matched second harmonic generation is used with a focused beam, there is a phase mismatch of the wave vector for small deviations from the phase matched direction due to the finite divergence of the beam. Because the efficiency of the nonlinear conversion process is a function of the power density within the nonlinear crystal, focusing is generally desirable in order to achieve high conversion efficiency.

When the phase matching angle is 90° for a particular nonlinear process in a given material, it is termed "non-critical phase matching" (NCPM). In such a case, effects of beam divergence vanish; that is to say, a strongly focused beam in an NCPM crystal does not have the phase mismatch problems as is evident in critical phase matching. In addition, the walk-off angle, which is the direction of energy flow of the fundamental and second harmonic beams, is zero, meaning that these two beams propagate collinearly within the crystal. It is obvious, then, that NCPM is the most favored and desirable means of operating a nonlinear material. One means by which NCPM can be obtained is by adjusting the temperature of the nonlinear crystal to the point where the refractive index of the fundamental wavelength equals that of the second harmonic wavelength.

Second harmonic generation, which has been discussed above, is a special case of a more general nonlinear optical conversion process known as sum frequency generation. In second harmonic generation, two waves of the same wavelength are combined to produce a single wave of a wavelength one half of the original fundamental wavelength. In sum frequency generation, two fundamental waves of different wavelengths are combined to produce a single wave. The wavelength produced by sum frequency generation is determined by the following equation:

$$\frac{1}{\lambda_1} + \frac{1}{\lambda_2} = \frac{1}{\lambda_3} \tag{1}$$

where $\lambda_1$ represents one of the fundamental wavelengths, $\lambda_2$ represents the second of the fundamental wavelengths and $\lambda_3$ represents the converted or summed wavelength.

It can be seen, then, that second harmonic generation is a degenerate case of sum frequency generation, where $\lambda_1 = \lambda_2$. The fundamental principles of nonlinear optics summarized briefly above are well known and are discussed in detail in the literature. See for example G. D. Boyd and D. A. Kleinman, *Journal of Applied Physics*, vol. 39, p. 3597, 1968.

Although second harmonic generation or "doubling" can be an efficient means for conversion to the blue, the nonlinear optical material KTiOPO4 (KTP) is non-critically phase matched at room temperature for SFG using fundamental wavelengths at 1.318 μm and 659 nm. See for example D. W. Anthon, G. J. Dixon, M. G. Ressl, and T. J. Pier, *SPIE Proceedings*, vol. 898, p. 68, 1988. The generated wavelength is 439 nm. It should be noted that KTP is a mature and well characterized material, unlike some of the nonlinear crystals that are required to produce 439 nm through second harmonic generation. In addition, because of the NCPM nature of the sum frequency process, this process will have an exceptionally wide angular and temperature bandwidth for NCPM SFG.

Typically, SFG requires two different laser sources. Because the efficiency of the sum frequency generation process depends on the power density within the optical crystal for cw operation, one requires an extremely small focus spot size within the nonlinear SFG crystal. A certain element of complexity is involved in using two separate lasers and this is a situation that is best avoided.

One technique for avoiding the use of two separate lasers for the sum frequency generation process is to use a laser to pump a gain element which emits one of the two fundamental wavelengths. If the wavelength of the pump laser matches the wavelength required for the second fundamental, one can combine the pump laser output with the pumped laser output to produce sum frequency generation. The only laser that is required to initiate and sustain this process is the lone pump laser. This technique was used for a diode pumped Nd:YAG laser. See for example W. P. Risk, J.-C. Baumert, G. C. Bjorklund, F. M. Schellenberg and W. Lenth, *Applied Physics Letters*, vol. 52, p. 85, 1988.

In this type of sum frequency generation a laser diode operating at 808 nm is used to pump a Nd:YAG laser which operates at 1.064 μm. The residual or unabsorbed 808 nm pump light is then circulated within the Nd:YAG laser resonator cavity which also includes a sum frequency generating KTP crystal. In such a system there is only one active laser, the laser diode. The Nd:YAG is optically excited by the laser diode and in essence serves as a frequency conversion device to convert some of the 808 nm light to 1.064 μm light. In this manner one might conclude that sum frequency generation is achieved with the use of only one active laser. A patent by Baumert et al., U.S. Pat. No. 4,791,631 describes this concept in detail.

A variation of this type of sum frequency generation process is to use an additional laser diode or laser diodes which do not pump the Nd:YAG directly but are used to introduce additional 808 nm light into the laser resonator. The laser resonator also contains the Nd:YAG crystal and the KTP nonlinear crystal. In this case a separate laser diode is used to pump the Nd:YAG laser. This concept has been described in detail by Dixon et al. in U.S. Pat. No. 4,879,723. However, laser diodes tend to be a poor choice for applications where moderate power (on the order of 1 Watt or greater) is required. This arises from the fact that higher power laser diodes do not operate in a single spatial mode with good spatial coherence. Spatial coherence and single mode operation allow the fundamental beam to be focused to a small waist in the nonlinear crystal for efficient SFG.

In general, solid state lasers, which by common usage are distinguished from laser diodes, are not effectively modulated at high modulation rates by modulating the pump power. The maximum modulation frequency is limited to the inverse of the lifetime of the dopant ion. For trivalent neodymium ions in YAG, the lifetime is 230 microseconds. Thus the maximum modulation rate is limited to approximately 4 kHz. Since modern communications systems require hundreds of megahertz to tens of gigahertz modulation rates, a solid state laser would have to be modulated externally to produce such rapid modulation. This can be accomplished by operating the solid state laser cw and having an electrooptic, acoustooptic or mechanical means to interrupt the beam. Duty factors for many communication systems are very low (the duty factor is the laser on time to laser off time). For pulse position modulation communications formats, the duty cycle is less than 1%. Therefore, operating the laser cw and using external modulation can be a highly inefficient means of operation. When primary power is limited, for example in remote installations such as a satellite or an unmanned vehicle, electrical efficiency is an important consideration.

The sum frequency generation process lends itself effectively to modulation of visible radiation at the high data rates characteristic of laser diodes, but using the advantages of solid state laser gain media. An example of this method is the following. If the output of a diode pumped Nd:YAG laser operating at 1.064 μm is mixed with the diode pump light, the intensity of the resulting 459 nm output will be linearly dependent on the intensity of the 808 nm fundamental. By modulating the 808 nm laser diode pump light at high frequencies, for example several hundred megahertz, an approximately cw output at 1.064 μm is produced, but the sum frequency generated output at 459 nm will be modulated at the same frequency as the 808 nm pump light.

The patent referred to previously by Baumert et al. describes a technique for a diode pumped Nd:YAG laser in which modulated output at 459 nm is produced. The laser diodes are operated at 808.5 nm, which is the ideal wavelength for pumping the Nd:YAG gain element. The patent referred to previously by Dixon et al. describes an essentially similar technique for producing high modulated 459 nm radiation from a diode pumped Nd:YAG laser. However, the concepts introduced by Baumert et al. and Dixon et al. suffer from two serious flaws. The first is that the laser diode wavelength is determined by the absorption spectrum of Nd:YAG; that is, the strongest absorption line occurs at 808.5 nm. However, the best wavelength for the SFG process, by which 1.064 μm and laser diode emission are combined to produce 459 nm emission in an NCPM KTP crystal, is not 808.5 nm but 806 nm.

Unfortunately, 806 nm is not an effective wavelength for pumping Nd:YAG. Therefore, in the concepts proposed by Baumert et al. and Dixon et al. diode laser emission must be generated at a wavelength which is not optimum for either or both Nd:YAG pumping and NCPM SFG in KTP, or introduce additional laser diodes. By introducing additional laser diodes one or more diodes can be used for 808.5 nm pumping of the Nd:YAG laser crystal while other diodes can be used to produce 806 nm radiation for 459 nm SFG. However, this system becomes cumbersome and requires numerous active lasers to produce the 459 nm SFG.

A more serious problem with both the Baumert et al. and Dixon et al. concepts is that the intracavity intensity at the approximately 808 nm fundamental wavelength is limited by absorption due to the Nd:YAG gain element contained within the cavity. As mentioned previously, intracavity SFG is required to produce efficient 459 nm output under cw operation because of the much higher circulating powers contained within a resonant cavity. By circulating 808 nm power within a cavity that also contains an absorbing material, the ultimate intensity that can be obtained at 808 nm is limited. This in turn limits the SFG conversion efficiency, which depends linearly on the 808 nm power.

A patent by Dixon, U.S. Pat. No. 5,142,542, discusses yet another technique for intracavity sum frequency generation by which a solid state laser gain element contained within a resonator is optically pumped. The optical pump radiation resonates within the laser cavity as well so that the cavity is doubly resonant for both wavelengths. That is, it is resonant for both the pump wavelength and the wavelength emitted by the laser gain element. In spite of the resonance for the two wavelengths, the presence of the solid state laser gain element contained within the doubly resonant cavity path through which the pump radiation must also resonate introduces strong absorption losses and reduces the intracavity power at the pump wavelength.

Note that the sum frequency generated power $P_3$ is given by the following expression equation (2):

$$P_3 = k_m P_1 P_2 \qquad (2)$$

where $P_1$ and $P_2$ are the two fundamental powers passing through the nonlinear sum frequency generating crystal, and $k_m$ is a constant determined by, among other things, the physical properties of the nonlinear sum frequency generating crystal and the beam focusing and phase matching conditions. It can be readily verified that for a fixed total power, that is, where $P_1 + P_2$ is a constant, $P_3$ is maximized when $P_1 = P_2$.

Absorption of the intracavity power from the pump radiation ($P_1$ for example) by the laser gain element increases the intracavity power at $P_2$. But $P_2$ is increased while $P_1$ is decreased, so that the resulting $P_3$ is lower than it would be if there were no absorption. Although the patent by Dixon cited above discloses a doubly resonant cavity, the presence of the laser gain element introduces absorption loss in the feedback path for $P_1$, the laser pump radiation, and reduces the magnitude of $P_3$.

Other versions of intracavity sum frequency generation at 1.06 μm and 808 nm have appeared in the literature. See for example W. P. Risk and W. Lenth, *Applied Physics Letters*, vol. 54, p. 789, 1989; and P. N. Kean and G. J. Dixon, *Optics Letters*, vol. 17, p. 127, 1992. However, neither of these published approaches provide a separate resonant path for the pump radiation relative to the intracavity laser gain element which absorbs this pump radiation. In the reference by Kean and Dixon cited above, an optically thin Nd:YAG slab is used to mitigate but not eliminate the absorption problem.

Sum frequency generation in an external cavity, see for example, W. P. Risk and W. J. Kozlovsky, *Optics Letters*, vol. 17, p. 707, 1992, circumvents the absorption problem but introduces alignment and mode matching difficulties that are not inherent in an intracavity sum frequency generation concept in which the laser gain element is also contained within that cavity. Additional variations of the sum frequency generation process using 808 nm and 1.06 μm to produce 459 nm radiation are reported by J. C. Baumert, F. M. Schellenberg, W. Lenth, W. P. Risk and G. C. Bjorklund, *Applied Physics Letters*, vol. 51, p. 2192, 1987 and W. Risk, J.-C. Baumert, G. C. Bjorklund, F. M. Schellenberg and W. Lenth, *Applied Physics Letters*, vol. 52, p. 85, 1988. However, these embodiments suffer from the same problem of reduced intracavity intensity at the pump wavelength (which is 808 nm in this case) due to absorption by the intracavity Nd:YAG gain element. The Nd:YAG gain element is required by the above referenced configurations to remain in the cavity in order to produce 1.06 μm radiation.

To produce efficient SFG for the process where 806 nm and 1.064 μm radiation are summed within a laser cavity to produce the 459 nm output, a technique using a two-branched coupled cavity resonator was designed. This concept is the subject of the above referenced patent applications by R. Scheps U.S. Patent and Trademark Office Ser. Nos. 08/108,131 (U.S. Pat. No. 5,333,142) and 08/183,212. In this two-branched coupled cavity device the Nd:YAG is kept separate from the feedback path which resonates the 806 nm intracavity optical flux. Therefore, one can have very high intracavity flux at both 1.064 μm and 806 nm without Nd:YAG absorption reducing the flux at 806 nm. The inventive concepts described in the above referenced Scheps patent applications Ser. No. 08/108,131 and 08/183,212 are useful for cw or pulsed operation. However, when used with solid state gain media, high modulation rates of the SFG output are not possible for the reasons described above.

Thus, in accordance with this inventive concept a continuing need has been found in the state of the art for a technique for intracavity sum frequency generation to produce visible output at high modulation rates using a nonlinear crystal composed of KTP which is non-critically phase matched, efficient, scalable to high power, insensitive to alignment problems, arises from a single laser source, and contains no elements within the cavity that reduce the intracavity power at either of the two fundamental wavelengths.

SUMMARY OF THE INVENTION

The present invention is directed to providing a technique for a modulated blue laser source produced by intracavity sum frequency generation within a doubly resonant cavity defined by a resonator. The sum frequency generating cavity contains a gain element which is optically pumped by a laser pump source. The cavity is resonant at both the pump wavelength frequency and the frequency of the radiation emitted by the laser gain element contained within the cavity. The resonator cavity contains a region where the two resonant wavelengths are spatially separated and a region where the two wavelengths are spatially overlapped or superimposed. Emission at or near the pump wavelength is produced by a laser located outside of the doubly resonant cavity. Emission from this laser is injected or introduced into the doubly resonant cavity in order to resonate therein and to build up to a high intracavity intensity.

A nonlinear sum frequency generating crystal is placed within the resonator region where the two wavelengths are superimposed, allowing the sum frequency generated wavelength to be efficiently produced. Modulation of the amplitude of the emission injected into the doubly resonant cavity produces a modulation of the amplitude of the sum frequency generated output at the same frequency as the modulation frequency of the injected emission.

The cavity has two separate regions, one where the wavelengths are spatially separated and one where they are overlapped. Combination of the two wavelengths from the spatially separate region to the spatially overlapped region can be accomplished with a dispersive element such as an intracavity prism, a dichroic beam splitter or a polarization beam combining optic, among others. The cavity is designed to provide feedback at the wavelength for which it is desired that the laser gain element operate. In this sense, the cavity can be viewed as a laser resonator cavity and would include highly reflective end mirrors, the beam combining optics and the laser gain element. In addition, the intracavity KTP crystal is placed in the region of the resonator common to both wavelengths. For the injected wavelength, which is introduced into the resonator in the region which is spatially separate, the cavity can be viewed as a high finesse Fabry-Perot cavity in which the intracavity intensity builds up to a much higher level than the intensity outside the cavity.

An important feature of the doubly resonant cavity for sum frequency generation is that virtually none of the laser emission injected into the cavity is absorbed by the laser gain element, and the injected laser emission can therefore build up to extremely high intensities. To maintain resonance at the injected laser wavelength the cavity length for the injected wavelength feedback path must be adjusted to an exact, integral number of wavelengths. This is accomplished with the use of a piezoelectric device and a feedback loop such as those commonly used for like purposes. These feedback loops and control circuits use a control technique referred to as the Pound-Drever method.

The resonator cavity containing the sum frequency generating crystal can therefore be viewed as a hybrid between a laser resonator cavity and a passive, intensity enhancing Fabry-Perot cavity. It is doubly resonant in the sense that both wavelengths, the injected wavelength and the wavelength emitted by the intracavity gain element, resonate within the cavity as constructed. The intracavity intensities therefore are much higher than they would be outside the cavity, enabling efficient sum frequency generation by the intracavity KTP crystal. The KTP crystal is located at a waist or focus within the laser cavity to enhance the power density within the crystal and produce even higher optical conversion efficiency for the sum frequency generated wavelength.

The laser emission that is injected into the cavity for resonance must be collimated and single transverse and longitudinal mode. Laser diodes of this type are commercially available at powers up to 150 mW cw in AlGaAs substrates which produce output from approximately 770 nm to 850 nm. In addition, commercial master oscillator power amplifier (MOPA) laser diodes are available which produce up to 1 Watt single transverse and single longitudinal mode at approximately 980 nm. Single longitudinal and single transverse mode laser diodes at 650 nm are limited currently to approximately 10 mW in a commercial device. However, over 100 mW have been demonstrated in a single longitudinal mode, single transverse visible laser diode, see for example R. S. Geels, D. F. Welch, D. P. Bour, D. W. Treat and R. D. Bringans, *Visible and UV Lasers*, R. Scheps, ed., Vol. 2115 of Proceedings of the SPIE, 1994. Continuing interest and growth in the development of higher power single mode visible laser diodes operating near 650 nm is compelling. Applications include both medical such as photodynamic therapy, and replacements of HeNe lasers. Therefore it is anticipated that further developments will allow higher power single longitudinal and single transverse mode laser diodes operating at 650 nm to become commercially available. Power levels comparable to those currently available in AlGaAs or in the MOPA design are anticipated.

OBJECTS OF THE INVENTION

Accordingly, an object of the invention is to provide a technique for sum frequency generation to produce a blue wavelength which can be modulatable at modulation rates from 0 Hz to 10 GHz.

Another object of the invention is to provide a cw technique for intracavity sum frequency generation by which a single active laser is used to produce both fundamental wavelengths required for sum frequency generation within a resonator cavity.

Another object of the invention is to provide a doubly resonant cavity which resonates fundamental wavelengths at 1.318 $\mu$m and 659 nm simultaneously, contains a means for modulating the amplitude of the 659 nm fundamental, and further contains a non-critically phase matched KTP crystal within the laser cavity to convert the intracavity power at the fundamental wavelengths to an amplitude modulated 439 nm radiation by means of intracavity sum frequency generation.

Another object of the invention is to provide a doubly resonant cavity which resonates fundamental wavelengths at 806 nm and 1.064 $\mu$m simultaneously, contains a means for modulating the amplitude of the 806 nm fundamental, and further contains a non-critically phase matched KTP crystal within the laser cavity to convert the intracavity power at the fundamental wavelengths to an amplitude modulated 459 nm radiation by means of intracavity sum frequency generation.

Another object of the invention is to produce efficient sum frequency generated visible radiation in the blue wavelength band that can be amplitude modulated at rates from 0 Hz to 10 GHz.

Another object of the invention is to produce efficient sum frequency generation in a doubly resonant cavity by creating a focus or waist in the resonant Gaussian mode in the region where both wavelengths are overlapped, and locating the non-critically phased matched nonlinear SFG crystal at said waist.

Another object of the invention is to provide a high finesse cavity for a laser emission that is introduced into the cavity and which builds up the intracavity intensity to a power level higher than outside the cavity.

Another object of the invention is to provide a means for beam combination within the doubly resonant cavity to allow both resonant wavelengths to be spatially overlapped or superimposed a region of the cavity.

Another object of the invention is to provide a means for adjusting the cavity length along the feedback path for the wavelength which is introduced into the cavity such that the cavity length is an integral number of wavelengths.

Another object of the invention is to provide a laser resonator cavity for a gain element which is located within the doubly resonant cavity.

Another object of the invention is to optically pump the laser gain element located within the doubly resonant cavity at the same wavelength as the wavelength injected into, and resonant in, the doubly resonant cavity.

Another object of the invention is to provide a resonator mode waist at the external face of the laser gain element to provide efficient end pumping of the laser gain element.

Another object of the invention is to provide a resonant cavity for the wavelength which is desired to be emitted by the laser gain element while providing simultaneously high losses at wavelengths not desired to be produced by said laser gain element within the doubly resonant cavity.

Another object of the invention is to provide a feedback path in the laser resonator cavity for the gain element contained within the cavity such that the gain element lases in the lowest order spatial transverse mode over a preselected wavelength range.

Another object of the invention is to provide a doubly resonant cavity which is resonant at two or more wavelengths simultaneously in which part of the resonator cavity mode is collimated.

Another object of the invention is to create a region in the doubly resonant cavity where the two wavelength feedback paths are spatially isolated so that the only wavelength which passes through the laser gain element is the wavelength emitted by the gain element.

Yet another object of the invention is to provide a doubly resonant cavity which operates simultaneously at two or more wavelengths in which the doubly resonant cavity mode contains a region where the two wavelengths are spatially overlapped or superimposed, that region further containing a nonlinear crystal for sum frequency generation such that the two wavelengths that resonate simultaneously are spatially superimposed within the nonlinear sum frequency generating crystal.

These and other objects of the invention will become more readily apparent from the ensuing specifications and drawings when taken in conjunction with the appended claims.

DETAILED DESCRIPTION OF THE PREFERRED EMBODIMENTS

Figure 1:
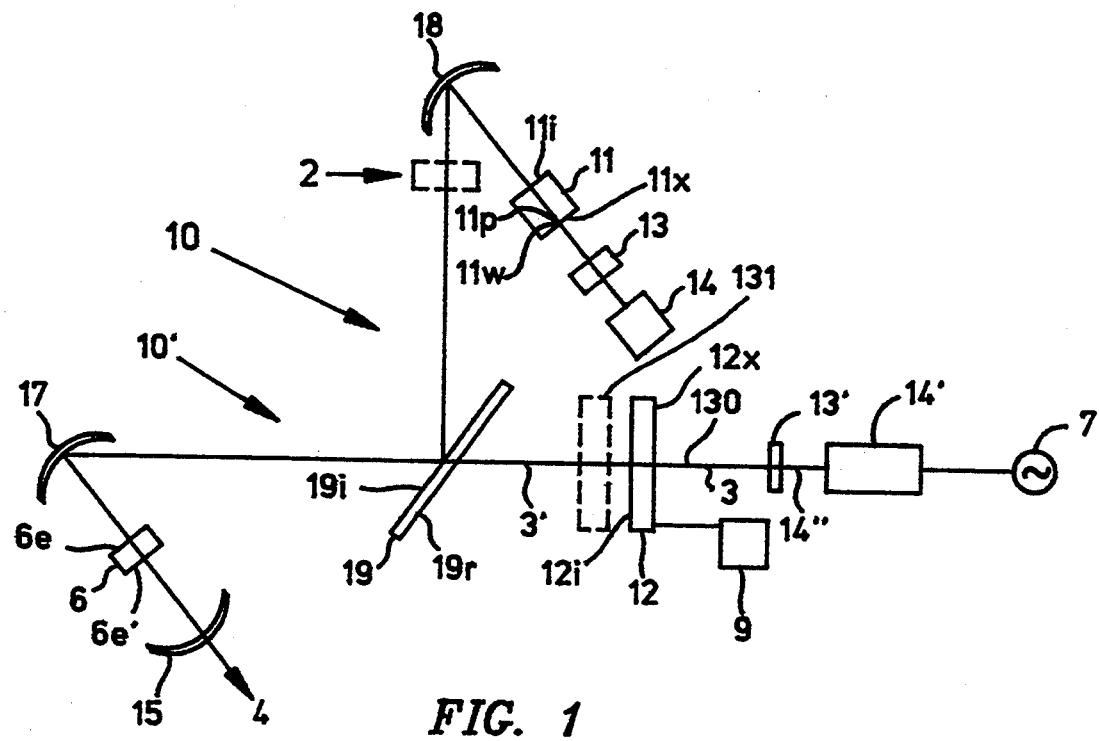
FIG. 1 illustrates the basic design of the doubly resonant cavity in which a dichroic beam splitter is used for beam combination.

This inventive concept involves the implementation of a doubly resonant cavity that allows simultaneous cw oscillation at two wavelengths and, in addition, includes a nonlinear sum frequency generating crystal to produce efficient sum frequency generation output. By modulating the amplitude of one of the two doubly resonant wavelengths, the sum frequency generated amplitude is also modulated. Thus, high modulation rates at power levels of 1 Watt or greater can be produced in the visible spectrum using this inventive concept. Excellent spatial coherence, and low beam divergence and narrow bandwidth output are additional benefits that can be obtained with this inventive concept. This inventive concept is a continuation in part of the above referenced patent applications in which a multifrequency, simultaneously tunable laser is described. Techniques for intracavity sum frequency generation were discussed and operation of a co-doped Cr,Nd:GSGG rod which is optically pumped at approximately 650 nm are also described in the above referenced patents and patent applications.

The design of the rapidly modulatable visible laser disclosed herein and in accordance with this inventive concept is generic and could be used with other fundamental wavelengths or other gain media. Sum frequency generation can produce other visible wavelengths to be modulated or can produce modulation at wavelengths in the ultraviolet or infrared regions of the electromagnetic spectrum. Crystalline or noncrystalline amorphous or glass-like gain media as well as liquid gain media such as dye lasers or chelate lasers or gaseous gain media could be used in this inventive concept. The sum frequency generating process disclosed herein can be either Type I or Type II and can produce sum frequency wavelengths from the ultraviolet to the infrared. Furthermore, the sum frequency generating crystal can be critically phase matched or non-critically phase matched. The fundamental wavelengths can be line narrowed to produce line narrowed sum frequency generated output. Or the fundamental wavelengths may be broadband, in which case a broadband sum frequency generated output may be produced. The technique described herein is appropriate for both cw and pulsed laser operation.

In accordance with this inventive concept the laser gain element in the doubly resonant cavity can be resonantly pumped or flash pumped. The wavelength range over which the doubly resonant cavity operates is determined by the nature of the gain medium as well as by the reflective coatings and transmission of the optical elements contained within the doubly resonant cavity. Modulation of one or both of the fundamental wavelengths is most easily accomplished if at least one of the fundamental wavelengths is produced by a laser diode.

Then, modulating the drive current for the laser diode produces an amplitude modulation in the fundamental wavelength emitted by said laser diode. However, other modulating means such as external modulation by electro-mechanical or acoustooptic or electrooptic shutters can be used to generate amplitude modulation for one or both of the two fundamental wavelengths. In addition, both fundamental wavelengths can be cw, which would produce a cw sum frequency generated output. The cw sum frequency generated output could be modulated externally using acoustooptic or electrooptic or optomechanical shutters or apertures or the like.

Referring now to the drawings wherein like reference numerals designate identical or corresponding parts throughout the several views, FIG. 1 illustrates a first embodiment of a doubly resonant cavity 10 defined by a resonator 10' in which intracavity sum frequency generation is produced. A laser gain element 11 is contained within the cavity and is optically pumped by pump laser 14. Pump laser 14 emits a beam which may be divergent or collimated. Using beam shaping optics 13, the emission from pump laser 14 is focused onto the end face 11x of laser gain element 11. End face 11x has a dichroic coating which is highly reflective (HR) at the laser wavelength for laser gain element 11 and highly transmissive at the pump wavelength emitted by pump laser 14. An interior face 11i of laser gain element 11 is coated anti-reflective (AR) at the laser emission wavelength from laser gain element 11.

In describing the operation of the doubly resonant intracavity sum frequency generating cavity illustrated in FIG. 1, laser gain element 11 is referred to as co-doped GSGG, that is, Cr,Nd:GSGG, and the pump laser wavelength emitted by pump laser 14 is referred to as 659 nm. The laser wavelength emitted by laser gain element 11 is referred to as 1.318 $\mu$m and an intracavity sum frequency generating crystal labeled 6 in FIG. 1 is referred to as KTP. The sum frequency generating process is referred to as Type II NCPM and the emitted wavelength is referred to as a blue wavelength at 439 nm. It is to be understood, however, that in accordance with this inventive concept, other laser gain elements, other wavelengths from the laser gain element, other pump laser wavelengths, other injected laser wavelengths, other nonlinear sum frequency generating crystals, other types of sum frequency generation and other sum frequency generated wavelengths can be produced in such a device as illustrated in FIG. 1.

As a specific example of an alternative sum frequency generation process that is described by this inventive concept, laser gain element 11 could be Nd:YAG, the laser wavelength emitted by laser gain element 11 could be 1.064 $\mu$m, the pump wavelength emitted by pump laser 14 could be 806 nm and the sum frequency generated output could be 459 nm. In addition, other wavelengths, other gain elements, and other nonlinear sum frequency generated wavelengths can be produced, consistent with this inventive concept in which a doubly resonant cavity is used for the intracavity sum frequency generating process and where the resonant path for one of the two fundamental wavelengths is spatially separate from intracavity elements, such as laser gain element 11, which absorb light at the fundamental wavelength. These features will become more clear as the description of the preferred embodiment is further elucidated.

A resonator mode is established and contained in resonator 10' between laser gain element 11, a concave fold mirror 18, a dichroic beam splitter 19, a SFG fold mirror 17 and an output coupler mirror 15. The reflective path for the laser wavelength emitted by laser gain element 11 extends from exterior face 11x to output coupler mirror 15. This reflective path defines one branch of a doubly resonant cavity 10. This resonator mode has two waists or focuses. One focus occurs at exterior face 11x in laser gain element 11 while the other occurs in SFG crystal 6. The resonator mode is collimated between concave fold mirror 18 and SFG fold mirror 17.

In the embodiment illustrated in FIG. 1 a second laser, 14', is used to inject coherent laser radiation at or near the pump wavelength emitted by laser 14 into doubly resonant cavity 10. Doubly resonant cavity 10 extends between output mirror 15 at one end and by both exterior face 11x of laser gain element 11 and an interior face 12i of an end mirror 12. The emission from laser 14' may be collimated or divergent. Beam shaping optics 13' are used to provide a collimated laser beam incident on end mirror 12 and to align the emission from laser 14' with the doubly resonant cavity 10. Alignment requires that input beam 3 from laser 14' is parallel to and coincident with resonator axis 3' within doubly resonant cavity 10. An exterior face 12x of end mirror 12 is AR coated for the wavelength emitted by laser 14', while interior face 12i is HR coated at the same wavelength. The HR coating is required to provide high finesse at the wavelength emitted by laser 14'. This high finesse allows a build-up of high intracavity power relative to the external power contained in input beam 3.

Dichroic beam splitter 19 is coated on a face 19r closest to laser 14' to be anti-reflective at the laser wavelength emitted by laser 14'. The other side of dichroic beam splitter 19, labeled 19i in FIG. 1, is coated to be highly reflective at the laser wavelength emitted by laser gain element 11, which in this exemplary case is 1.318 μm, and simultaneously anti-reflective coated for the wavelength emitted by laser 14'.

The reflective path for laser radiation injected into doubly resonant 10 cavity by laser 14' extends from interior face 12i of end mirror 12 to output coupler 15. The injected radiation passes through dichroic beamsplitter 19 and is reflected by SFG fold mirror 17. The resonator mode for this wavelength is collimated between interior face 12i of end mirror 12 and SFG fold mirror 17, and is focused to a waist in nonlinear sum frequency generating crystal 6 at the same location as that produced by the 1.318 μm radiation emitted by laser gain element 11 in this exemplary case.

Mirrors 17 and 15 are dichroic coated to be highly reflective at both the wavelengths emitted by laser gain element 11 and laser 14', which in this exemplary case would be 1.318 μm and 659 nm, respectively. The end faces of KTP crystal 6, labeled 6e and 6e', are coated anti-reflective for both 1.318 μm and 659 nm. Output coupler mirror 15 is coated to be highly transmissive at the sum frequency generated wavelength which in this exemplary case is 439 nm.

Laser gain element 11 and laser 14' are oriented to produce orthogonal polarizations in SFG crystal 6. For lasers that naturally emit polarized output, the orientation of the crystal about the laser emission axis will determine the orientation of the polarization. Therefore, laser 14' and laser gain element 11 need only be rotated about their respective laser emission axes for each laser to produce the orthogonal polarization, if both laser gain element 11 and laser 14' emit plane polarized output. In the case where one or neither of these outputs are polarized, that is, where one or both emit isotropic radiation, the insertion of polarizing elements such as Brewster plates or other devices which introduce extremely small losses, may be used to polarize the output. The polarization devices can be oriented to produce the orthogonal polarization in SFG crystal 6 that is required for Type II sum frequency generation.

To make the resonant path for laser emission 14" injected into the cavity by laser 14' equal to an exact number of wavelengths, very small spatial adjustments are required in the position of end mirror 12 relative to dichroic beam splitter 19. Moving end mirror 12 back and forth along the axis labeled 3' adjusts the resonant path length for 659 nm radiation in this exemplary case. As extremely small movements are required, an appropriate device might be a piezo-electric (PZT) actuator such as that labeled 9 in FIG. 1. It is desirable that PZT actuator 9 be incorporated into an active feedback loop so that continuous adjustments in the path length can be accomplished. This is desirable because thermal drift will naturally change the path length within doubly resonant cavity 10 and destroy the resonance along path 3' for the 659 nm radiation. Therefore, an electrically activated device capable of active feedback control through a computer or other suitable means is desirable to correct for drift or other effects which change the path length for feedback of the 659 nm radiation during the course of operation of doubly resonant cavity 10.

One of the advantages of using co-doped GSGG for laser gain element 11 is that the most appropriate wavelength for sum frequency generation produced by laser 14' can also be used by pump laser 14 to efficiently pump laser gain element 11. That is to say, laser 14' and pump laser 14 can operate at exactly the same wavelength. In this case it is not necessary to have two separate lasers (14 and 14') and operation can be achieved with a single laser as illustrated in the embodiment shown in FIG. 2.

Figure 2:
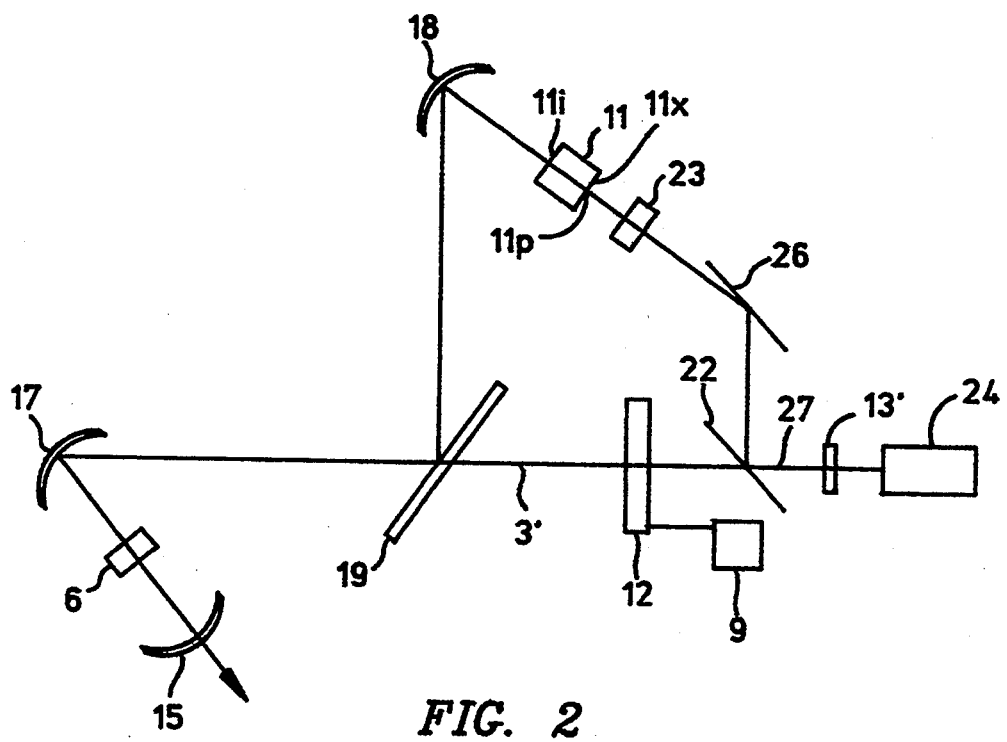
FIG. 2 illustrates a second embodiment of this inventive concept.

Referring to FIG. 2, a single pump laser 24 emits the appropriate wavelength (659 nm in this exemplary case) for operation of doubly resonant cavity 10. Collimated laser emission 27 produced by beam shaping optics 13' is split by beam splitter 22. Part of the output, for example 50%, continues towards end mirror 12 into doubly resonant cavity 10 similar to the embodiment illustrated in FIG. 1. Part of laser emission 27, for example 50%, is reflected by beam splitter 22 to reflective mirror 26. Reflective mirror 26 can be flat or curved, and in conjunction with beam shaping optics 23 produces a pump beam focus or pump beam waist 11p at exterior face 11i of gain element 11. Note that in both FIG. 1 and FIG. 2 refraction of resonator axis 3' through dichroic beam splitter 19 is not illustrated for ease in understanding this inventive concept. Refraction, however, is accounted for in actual practice and does not adversely affect operation of the embodiments illustrated in FIG. 1 or FIG. 2.

In order to achieve efficient intracavity sum frequency generation KTP crystal 6 must be oriented properly and cut properly with respect to the crystalline axes. For Type II sum frequency generation using 1.318 μm and 659 nm fundamental radiation to produce 439 nm SFG output in the example of FIG. 1, the KTP crystal is cut along the X, Y and Z axes and is referred to as an XYZ cut crystal. In this configuration the crystal is cut as a rectangular solid with sides located in the XY, YZ, and XZ planes. Propagation is along the X axis and the end faces of the crystal 6e and 6e' in FIG. 1 are located in the YZ planes. Note that this orientation of the KTP crystal is distinctly different than that for the sum frequency generating process in which 806 nm and 1.064 μm fundamentals are combined to produce the SFG wavelength at 459 nm. In the latter process, the propagation direction is along the Y axis in the KTP crystal and the end faces are therefore in the XZ plane.

Referring once again to FIG. 1, in order to produce a rapidly modulated output 4 at 439 nm at least one of the two fundamental wavelengths must be modulated rapidly. Since the lifetime of the trivalent neodymium in GSGG will not allow modulation rates beyond several kilohertz, rapid modulation of blue output 4 is accomplished by rapid modulation of fundamental wavelength 14" emitted by laser 14'. Laser 14' can be an exemplary laser diode operating at 659 nm. This laser diode emits a single spatial, single longitudinal mode 14" and is driven by an electrical current called the injection current. By appropriately modulating injection current supply 7, an amplitude modulation is produced in the emission 14" of laser diode 14'. Thus, the 1.318 μm radiation emitted by laser gain element 11 is cw while the intracavity power at 659 nm is rapidly modulated.

Note that the upper limit to the modulation frequency of blue output 4 is limited to the inverse of the photon cavity lifetime. The cavity lifetime is the exponential decay time $\tau_c$ for optical flux in the cavity (in the absence of laser gain) and is given by equation (3):

$$\tau_c = \frac{T}{\delta_c} \quad (3)$$

where T is the round trip time and $\delta_c$ represents the round trip cavity losses.

For a 1 GHz modulation rate, $\tau_c$ should be 1 ns. Light travels 30 cm in 1 ns. If the resonant path length for the 659 nm radiation is taken as 15 cm, then the round trip time is 1 ns. As all of the coatings for 659 nm are low loss, the major source of loss for the intracavity 659 nm optical flux is the sum frequency generation process itself. The SFG process converts part of the intracavity flux to 439 nm radiation, which is then emitted as 4 through output mirror 15. If this loss amounts to only 1% of the intracavity power, then the modulation rate is limited to approximately 10 MHz. On the other hand, if a higher fraction of the intracavity power at 659 nm is converted to 439 nm radiation, for example 70 percent, then the loss is approximately 1 and the maximum modulation rate will be 1 GHz. Note also that the cavity can be shortened considerably, particularly along the feedback path 3', in which case the photon lifetime will be much shorter for a given intracavity loss. In addition, the cavity losses can be increased by reducing the reflectivity of one or more of the mirrors in doubly resonant cavity 10, further reducing the photon lifetime. It is to be noted that reducing the reflectivity of the mirrors reduces the intracavity power at the respective fundamental wavelength and hence the SFG power will decrease.

In order to generate the 1.318 μm transition in the co-doped GSGG, high losses must be produced in the cavity for the 1.06 μm transition. These losses are easily incorporated into the embodiment shown in FIG. 1 by coating concave fold mirror 18 to be highly transmissive at 1.06 μm. In addition, face 19i of dichroic beam splitter 19 can be coated highly transmissive at 1.06 μm as well. For cw operation the losses introduced by the high transmissive coatings on concave fold mirror 18 and dichroic beam splitter 19 should be sufficient to keep the 1.06 μm transition from operating. However, if needed or desired, SFG fold mirror 17 and output coupler mirror 15 can also be coated to be highly transmissive at 1.061 μm.

Figure 3:
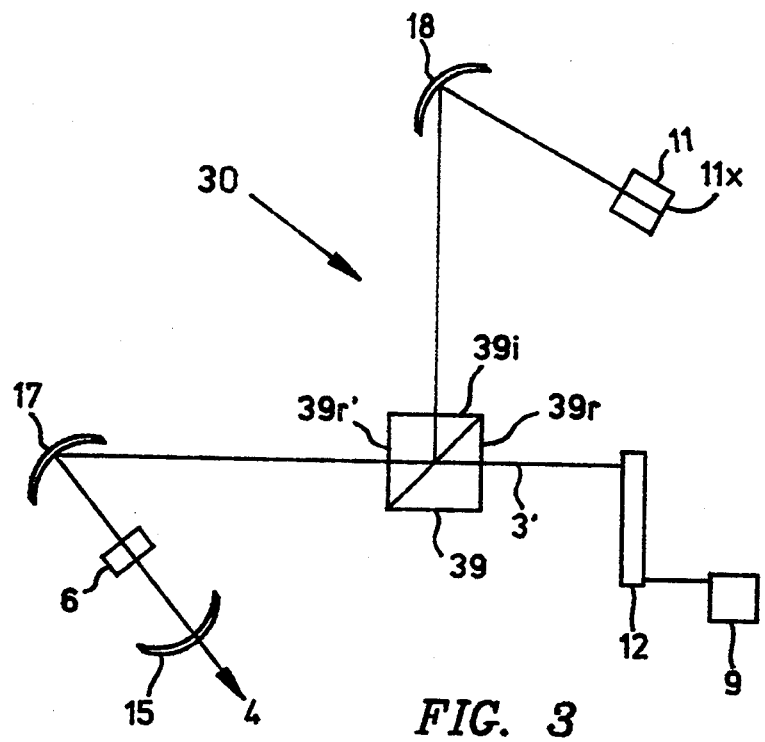
FIG. 3 illustrates a third embodiment of this inventive concept in which a polarizing beam combiner cube is used for beam combination.

Referring to FIG. 3, a third embodiment of this inventive concept is illustrated. In FIG. 3 only the components comprising the doubly resonant cavity are illustrated; the beam shaping optics and laser pump optics illustrated in FIGS. 1 and 2 are not shown for ease in understanding this inventive concept. Doubly resonant cavity 30 contains output coupler mirror 15, SFG fold mirror 17, concave fold mirror 18, exterior face 11x of laser gain element 11, and end mirror 12. Beam combination for the wavelengths 659 nm and 1.318 μm is provided by polarization beam combiner cube 39. This cube is designed to reflect the linearly polarized 1.318 μm radiation while transmitting the orthogonal polarization for the 659 nm transition. Note that because the 1.318 μm wavelength is exactly twice the 659 nm wavelength, standard polarization coating techniques will be adequate. Faces 39r and 39r' of polarization beam combining cube 39 are coated AR at 659 nm in this exemplary case while face 39i of polarization beam combining cube 39 is coated AR at 1.318 μm in this exemplary case. Since sum frequency generation is Type II, the orientation of the polarization of the 659 nm fundamental must be orthogonal to the polarization of the 1.318 μm fundamental in SFG crystal 6. Therefore, polarization beam combiner cube 39, which reflects one polarization and transmits the orthogonal polarization, is an ideal beam combining element as shown in the embodiment illustrated in FIG. 3.

Figure 4:
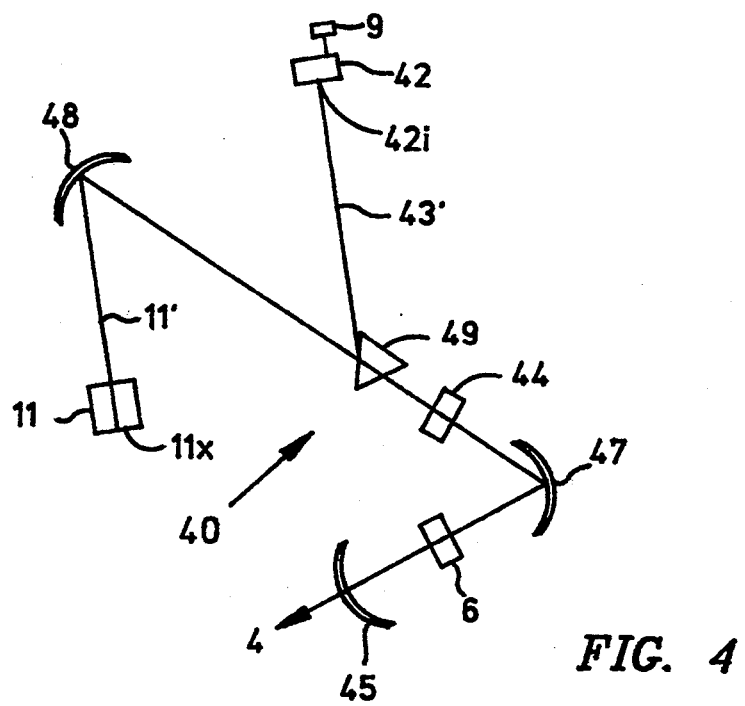
FIG. 4 illustrates a fourth embodiment of this inventive concept in which a dispersive prism is used for beam combination.

Referring now to the embodiment illustrated in FIG. 4, dispersing prism 49 is used for beam combination in doubly resonant cavity 40. In this illustration, as was done in FIG. 3, only the components defining doubly resonant cavity 40 are shown. The pump lasers and beam shaping optics are not illustrated for ease of understanding this inventive concept. However, it is to be understood that such components as pump lasers and beam shaping optics are required for this embodiment and said components are similar or identical to those illustrated in FIG. 1 or FIG. 2. In the exemplary case illustrated in FIG. 4 Brewster angled, dispersing prism 49 is used for beam combination. This prism may be composed of one or more prisms which are oriented in such a manner as to add their dispersion. As illustrated in FIG. 4, dispersing prism 49 is oriented for minimum deviation to provide minimum astigmatism to the output beam. The optical material that dispersing prism 49 is composed of should be highly dispersive for 1.318 μm and 659 nm in this exemplary case and introduce low absorption loss at these two fundamental wavelengths. Faraday rotator glasses are glasses used for Faraday polarization rotators and typically have high dispersion. Such glasses can be considered for the optical material from which dispersive prism 49 is made. However, many optical glasses absorb significant amounts of radiation at wavelengths of 1.3 μm and above, and therefore are not suitable materials for dispersing prism 49.

The feedback path for the resonator mode at 1.318 μm includes exterior face 11x of laser gain element 11, concave fold mirror 48, dispersing prism 49, SFG fold mirror 47 and output coupler mirror 45. The resonant path for 659 nm radiation includes interior face 42i of end mirror 42, dispersing prism 49, SFG fold mirror 47 and output mirror 45. Because of the Brewster faces of dispersing prism 49, low loss operation can only take place if the polarization of the two fundamental wavelengths is parallel as they pass through dispersing prism 49. Therefore, the orientation of the polarization produced along a feedback path 43' and a 1.318 μm feedback path 11', produced by laser gain element 11, must be such that the polarization of the two fundamental wavelengths are parallel as the fundamental wavelengths enter and exit dispersing prism 49.

In the case where the injected signal (the optical laser flux introduced into doubly resonant cavity 40 through end mirror 42) or laser emission produced by laser gain element 11 is isotropic and therefore not polarized, the Brewster faces provided by dispersing prism 49 will polarize the radiation. That is, if laser gain element 11 typically produces an isotropic output, or the laser signal injected along path 43' is isotropic, the difference in loss for the $\pi$ and $\sigma$ polarizations induced by the two Brewster faces of dispersing prism 49 will be sufficient to allow only the $\pi$ polarization to resonate. In order to accommodate efficient Type II sum frequency generation, the polarization of the two fundamental wavelengths must be oriented to be orthogonal within SFG crystal 6.

The proper orientation of the polarization for both fundamentals passing through dispersing prism 49 and through SFG crystal 6 can be provided by use of a waveplate 44 as illustrated in FIG. 4. This waveplate is a multiple order waveplate that rotates the polarization of one fundamental an integral number of full waves while rotating the polarization of the other fundamental an integral number of half waves. Such wave plates are commercially available and introduce very low insertion loss. In addition, it is not significant which of the two fundamentals is rotated by the integral number of full waves and which is rotated by the integral number of half waves, although the orientation of the crystalline axes of SFG crystal 6 must be aligned to properly match the polarization of the two fundamental waves. If, for example, waveplate 44 rotates the 659 nm polarization by an integral number of half wave rotations while rotating the polarization of the 1.318 μm fundamental by an integral number of full rotations, then the parallel polarization for the two fundamentals emerging from dispersing prism 49 as these beams propagate toward waveplate 44 are rotated into an orthogonal orientation upon emergence from waveplate 44. The orthogonal polarization orientation is maintained upon reflection through SFG fold mirror 47, SFG crystal 6 and output coupler mirror 45. Upon reflection from output coupler mirror 45, the orthogonal polarization continues to be maintained as the two fundamentals pass once more through SFG crystal 6 and are reflected by SFG fold mirror 47. Upon reflection from SFG fold mirror 47, the two fundamentals pass once again through waveplate 44, this time in the direction of dispersing prism 49. Upon emerging from waveplate 44 the polarizations are rotated once again and are now oriented parallel to one another. This parallel orientation is required for low loss through prism 49 as indicated earlier.

The embodiments illustrated in FIGS. 1–4 contain substantial differences but also have several important elements in common. For one, in all cases a mode waist is produced within nonlinear sum frequency generating crystal 6. In addition, the resonator mode between the SFG fold mirror and the output coupler mirror is nearly concentric. This is required to produce an extremely small waist within nonlinear SFG crystal 6. The nearly concentric resonator mode is established by producing a waist at the focal point of the SFG fold mirror and spacing the output mirror approximately one radius of curvature away from this waist position. As the focal length of a curved mirror is one half of the radius of curvature, it is clear that the waist produced between the sum frequency generating fold mirror and the output mirror is located twice as far from the output mirror as it is from the SFG fold mirror.

This nearly concentric orientation producing the concentric resonator mode for the branch of the doubly resonant cavity which contains the nonlinear SFG crystal has several important advantages. For one, it is possible to produce extremely small waist dimensions within the KTP crystal using this configuration. A confocal mode configuration, for example, would produce a much larger waist. Beam waists as small as 10μ can easily be produced with high stability inside the KTP crystal using a nearly concentric configuration. Since the sum frequency generation efficiency depends on the intracavity power density, the smaller the mode waist, the higher the conversion efficiency. Note that for critically phase matched nonlinear optical processes, establishing a very small mode waist with a highly divergent beam in the nonlinear crystal can in fact produce lower efficiency than would be obtained with a collimated beam. This is due to Poynting vector walk-off problems.

However, because the KTP crystal is non-critically phase matched, very high angular divergences do not produce inefficient sum frequency generation, and this is an important feature of the present inventive concept. That is, a resonator can be constructed with an extremely small beam waist using a highly divergent resonator mode within the sum frequency generating crystal and thereby greatly enhance the conversion efficiency.

A second important advantage of the nearly concentric configuration of the resonator mode in the SFG arm of the doubly resonant cavity is that reflections of the fundamental modes by the AR coated end faces of the KTP crystal are mode matched and do not contribute to the loss. That is, reflections by the end faces of the KTP crystal match the resonator mode. Upon reflection by the KTP crystal end faces, the reflected power stays in the doubly resonant cavity and is therefore not lost.

Another feature that the embodiments shown in FIGS. 1–4 share in common is the establishment of two distinct regions of the doubly resonant cavity. In one region the two wavelengths are perfectly overlapped and spatially aligned, while in the other region the two fundamental wavelengths are spatially separate and distinct. As has been indicated above, this is vital for producing high intracavity powers at two wavelengths in a cavity where an optical component such as a laser gain element is placed which will absorb radiation at one of the two fundamental wavelengths. In this exemplary case laser gain element 11, which produces radiation at 1.318 μm, strongly absorbs at 659 nm, which is the wavelength of the other fundamental in this exemplary case. Similarly, in the case where 1.064 μm radiation from a Nd:YAG gain element is summed with 806 nm radiation, absorption at 806 nm arises due to the Nd:YAG gain element. Therefore, higher SFG conversion efficiency will be produced by establishing a separate region in the doubly resonant cavity where laser gain element 11 can not interact with the fundamental wavelength that it can absorb.

Another feature which is common to the embodiments shown in FIGS. 1–4 is the establishment of a region of the doubly resonant cavity where both fundamental wavelengths are spatially overlapped and superimposed. The sum frequency generating crystal is placed in this region. This allows efficient sum frequency generation without alignment problems that would be incurred by using an external resonator. More importantly, this inventive concept, by resonating both fundamental wavelengths in a common resonator, ensures that the spatial intensity profiles of both fundamentals are nearly identical, leading to the optimum sum frequency generating efficiency.

Referring once again to FIG. 1, it was previously indicated that modulation of blue output 4 can be produced in this inventive concept by a modulating injected optical emission 130 in doubly resonant cavity 10. Modulation can be effected for a cw laser 14' by using an external modulator 131 such as an electro-optical or acousto-optical modulator along input beam 3. However, the highest electrical efficiency occurs by modulating the amplitude of injected optical emission 130 by modulating the drive current for laser 14', as discussed previously. This is most effectively performed when laser 14' is a laser diode.

The embodiments illustrated in FIGS. 1 and 2 illustrate laser gain element 11 as an end pumped laser gain element. End pumping provides the optimum efficiency for optical excitation. In the end pumped configuration shown in FIG. 1, for example, beam shaping optics 13 provides a pump waist 11$p$ that is spatially matched to resonator mode waist 11$w$. This mode matching guarantees that the active volume created by the pump power incident on laser gain element 11 is coincident with the extracted resonator volume in laser gain element 11. Therefore, optimum efficiency can be achieved and slope efficiencies of 70% or more have been reported in the literature for this type of pumping.

While end pumping is preferred for high efficiency, this inventive concept can also work with side pumping. In side pumping laser gain element 11 is excited transverse to the resonator axis. Side pumping can be effected with a monochromatic laser source or by black body broadband radiative source such as one or more lamps. As it is important to establish a TEM$_{00}$ cavity mode for the 1.318 $\mu$m radiation, end pumping is ideally suited since this technique, as described above and incorporated into this inventive concept, establishes a gain aperture in the laser crystal. This technique minimizes the loss and is the most efficient means for producing a TEM$_{00}$ resonator mode. For side pumping, higher order transverse modes are typically observed and therefore the insertion of intracavity apertures to select the TEM$_{00}$ mode are required. Large losses are generally associated with the insertion of an intracavity "hard aperture".

The free running bandwidth of the laser emission produced by laser gain element 11 in the doubly resonant cavity configuration is typically on the order of 0.3 nm. See for example R. Scheps and J. F. Myers, *IEEE Journal of Quantum Electronics*, to be published, 1994. Blue output 4 will have a bandwidth comparable to the bandwidth of the emission from laser gain element 11, especially if the bandwidth of injected optical emission 130 introduced into doubly resonant cavity 10 is much narrower.

For many applications this bandwidth is satisfactory, but for narrower bandwidths of the sum frequency generated output an intracavity etalon labeled 2 in FIG. 1 can be used. For example, a 0.5 mm thick etalon is found to reduce the bandwidth from approximately 0.3 nm to 0.04 nm. A second etalon, 10 mm thick, used in conjunction with the 0.5 mm etalon, reduces the bandwidth further to 0.001 nm and produces an SFG output of 0.001 nm as well. In order to operate effectively, the etalon must be located in a region of 1.318 $\mu$m feedback path 11' where the resonator mode is collimated. Such regions exist in the embodiments illustrated in FIGS. 1–4 and have been previously described.

Figure 5:
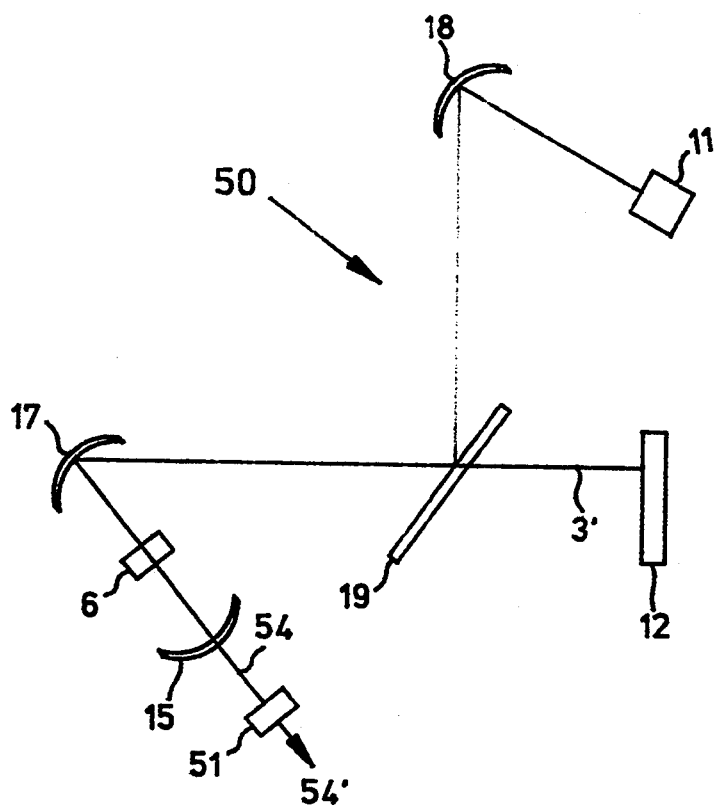
FIG. 5 illustrates a fifth embodiment of this inventive concept in which an external modulator is used.

A fifth embodiment of this inventive concept is illustrated in FIG. 5. Only the components comprising the doubly resonant cavity 50 are illustrated in FIG. 5. It is once again to be noted that the pump sources and beam shaping optics are required for this inventive concept but are omitted in the schematic representation of this embodiment illustrated in FIG. 5 for ease of understanding this inventive concept. The beam shaping optics and pump sources that are illustrated in FIGS. 1 and 2 are entirely appropriate for the embodiment illustrated in FIG. 5.

The embodiment illustrated in FIG. 5 shows a dichroic beam splitter 19 used for beam combination. However, it is to be understood that other means disclosed herein for beam combination such as dispersing prism 49 of the embodiment illustrated in FIG. 4, or polarization beam combiner cube 39 of the embodiment illustrated in FIG. 3 would also be appropriate. The embodiment illustrated in FIG. 5 modulates the SFG blue output 54 externally. Therefore the limitation to the maximum modulation rate imposed by the photon cavity lifetime is avoided. In this embodiment the output of laser gain element 11 is purely cw and the second fundamental injected through end mirror 12 and resonant along optical path 3' in doubly resonant cavity 50 is also cw. Therefore, sum frequency generation output 54 will be cw as well as it is emitted through output coupler mirror 15. External modulator 51, which can be an electro-optical or acousto-optical or opto-mechanical shutter or aperture or the like is used to modulate SFG output 54 and produce a modulated output 54' at 439 nm in this exemplary case.

Figure 6:
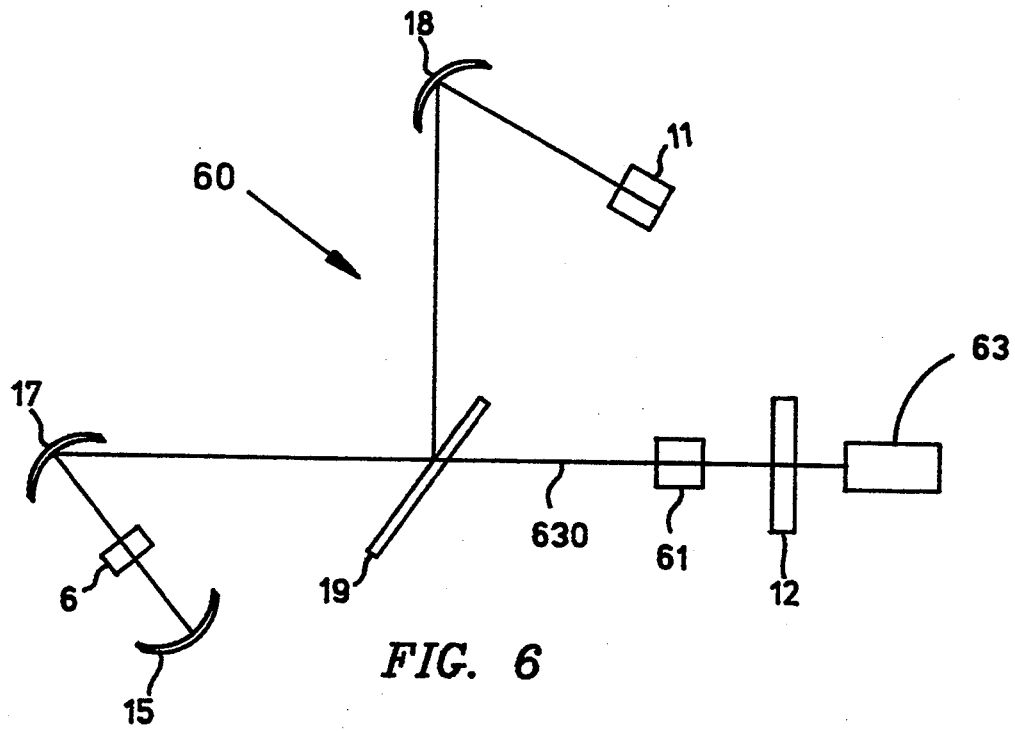
FIG. 6 illustrates a sixth embodiment of this inventive concept in which an intracavity optical amplifier is used.

A sixth embodiment of this inventive concept is illustrated in FIG. 6. In this inventive concept the optical pump source and beam shaping optics that are required to provide optical excitation for laser gain element 11 are not shown for ease of understanding this embodiment of this inventive concept. The optical source and beam shaping optics can be similar or identical to those discussed in relation to the embodiment shown in FIG. 1. Furthermore, the embodiment shown in FIG. 6 is illustrated with dichroic beam splitter 19, which is used for beam combination. However, other means of beam combination such as polarization, beam combiner cube or a Brewster faced dispersing prism may be used in place of dichroic beam splitter 19 illustrated in FIG. 6.

Laser gain element 11 produces a resonant frequency of 1.318 $\mu$m in doubly resonant cavity 60 in this exemplary case. In addition, optical source 63, which may include beam shaping optics as well as an optical emitter, emits a collimated single frequency, single transverse mode, single longitudinal mode, coherent beam at 659 nm in this exemplary case. This beam is aligned to superimpose and match resonant feedback path 630 in doubly resonant cavity 60. The emission from optical source 63 is injected into doubly resonant cavity 60 through end mirror 12. Placed within the cavity and along resonant feedback path 630 is an optical amplifier 61. Optical amplifier 61 amplifies the injected signal emitted by optical source 63 at the injected frequency. The spatial coherence or bandwidth properties of the injected signal emitted by optical source 63 are not altered as a consequence of passage through optical amplifier 61.

For an injected signal at 659 nm, for example, optical amplifier 61 can consist of a AlGaInP laser diode that has been AR coated at 659 nm on both the entrance and exit facet. Alternatively, optical amplifier 61 can be any other medium, semiconductor, solid state, liquid or gas which provides optical gain at the injected signal wavelength, which in this exemplary case is 659 nm. The advantage of using an AlGaInP semiconductor optical amplifier for optical amplifier 61 is that the drive current for optical amplifier 61 can be rapidly modulated. This modulation is independent of whether or not the injected signal from optical source 63 is modulated. Therefore, this avoids the problem, well known for semiconductor lasers, of "frequency chirp".

Frequency chirp arises from variations in the refractive index in the active region of a semiconductor material and is a consequence of variations of the electron density due to the modulation of the injected electrical signal. Frequency chirp results in a wavelength shift of the laser diode output of several hundredths of a nm to several tenths of a nm, depending on the magnitude of the variation in the injected signal. By using a purely cw semiconductor source for optical source 63, the signal injected by optical source 63 into doubly resonant cavity 60 will be a stable, fixed frequency emission. The amplitude modulation of this signal can then be provided by optical amplifier 61, whose optical gain is modulated as a consequence of modulating the drive current to optical amplifier 61. As optical amplifier 61 is not a regenerative amplifier, the resulting change in the refractive index as a function of the modulation of the injected electrical current into the semiconductor junction region of optical amplifier 61 is inconsequential in terms of its effect on the resonant frequency within doubly resonant cavity 60.

It is to be noted that optical amplifier 61 can be an end pumped or side pumped amplifier, composed of any suitable gain material. In addition, optical amplifier 61 can be a single pass or a multiple pass amplifier.

Referring once again to FIG. 1, the components illustrated in FIG. 1 comprise an embodiment of a resonator apparatus. However, features discussed herein may be incorporated into the other embodiments, as well as other modifications apparent to one skilled in the art having the teachings of this inventive concept in mind. The features of the resonator apparatus include all those discussed herein and are not limited to a doubly resonant cavity and all of the components which define said cavity and are contained therein; the pump sources and beam shaping optics; the PZT actuator, associated feedback electronics and optical mounts; the modulation circuits and other required electronics; and external modulators such as opto-mechanical, electro-optical or acousto-optical shutters and the like. A doubly resonant cavity used for sum frequency generation in accordance with this inventive concept has a wide range of applications including various communications, sensing, pollution monitoring, medical, laser ranging, aircraft wind speed and wind shear measurement applications and surveillance.

It should therefore readily be understood that many modifications and variations of the present invention are possible within the purview of the claimed invention. It is therefore to be understood that within the scope of the appended claims the invention may be practiced otherwise than as specifically described.

I claim:

1. An apparatus for simultaneously resonating two wavelengths within a preselected range of wavelengths for producing an amplitude modulated third wavelength by sum frequency generation, said third wavelength being modulated at a modulation frequency in the range between 0 Hz and 10 GHz comprising:

a resonator defining a resonator cavity for said simultaneously resonating two wavelengths within said preselected range of wavelengths, said resonator cavity defined by two end reflective elements, two highly reflective concave fold mirror elements, a beam combining element, and an output coupler reflective element arranged to form a reflective path therebetween for a resonator mode in said resonator cavity;

said beam combining element disposed in said resonator cavity between said two highly reflective concave fold mirror elements to combine said simultaneously resonating two wavelengths in one region of said resonator cavity, and to disperse said simultaneously resonating two wavelengths each along a separate path in another region of said resonator cavity;

a laser gain element disposed in said resonator cavity to produce laser emission including one of said two wavelengths in said preselected range of wavelengths;

means for optically exciting said laser gain element in an end pumping mode to produce said laser emission that includes said one of said two wavelengths in said preselected range of wavelengths;

a laser source aligned and appropriately disposed to inject an optical emission including the other of said two wavelengths within said preselected range of wavelengths into said resonator cavity to resonate therein;

means disposed to effect an amplitude modulation of said third wavelength produced by said resonator apparatus; and, a nonlinear optical crystal located within said resonator cavity having the property to generate said third wavelength, said third wavelength being the sum frequency of said two wavelengths.

2. The resonator apparatus of claim 1 in which said beam combining element is a dichroic beam splitter.

3. The resonator apparatus of claim 1 in which said beam combining element is a polarization beam combiner cube.

4. The resonator apparatus of claim 1 in which said laser gain element is a co-doped laser gain element.

5. The resonator apparatus of claim 4 in which said laser gain element is Cr,Nd:GSGG.

6. The resonator apparatus of claim 1 in which said laser gain element is Nd:YAG.

7. The resonator apparatus of claim 1 in which said laser source for injecting said optical emission into said resonator cavity is a laser diode.

8. The resonator apparatus of claim 7 in which the emission of said laser diode is amplitude modulated by modulating the injection current to said laser diode to produce said amplitude modulated third wavelength.

9. The resonator apparatus of claim 1 in which one of said two wavelengths is 1.318 μm and is emitted by said laser gain element, and the other of said two wavelengths is 659 nm and is emitted by said laser source for injecting said optical emission into said resonator cavity, and said third wavelength is 439 nm.

10. The resonator apparatus of claim 9 in which said nonlinear crystal is a KTP crystal cut for Type II non-critically phase matched sum frequency generation.

11. The resonator apparatus of claim 9 in which said laser source for injecting said 659 nm said optical emission into said resonator cavity is an AlGaInP laser diode.

12. The resonator apparatus of claim 11 in which said optical emission of said AlGaInP laser diode is amplitude modulated by modulating the injection current to said AlGaInP laser diode to produce an amplitude modulation of said 439 nm said third wavelength.

13. The resonator apparatus of claim 1 in which one of said two wavelengths is 1.06 μm and is emitted by said laser gain element, and the other of said two wavelengths is 806 nm and is emitted by said laser source for injecting said optical emission into said resonator cavity, and said third wavelength is 459 nm.

14. The resonator apparatus of claim 13 in which said nonlinear crystal is a KTP crystal cut for Type II non-critically phase matched sum frequency generation.

15. The resonator apparatus of claim 13 in which said laser source for injecting said 806 nm said optical emission into said resonator cavity is an AlGaAs laser diode.

16. The resonator apparatus of claim 15 in which said optical emission of said AlGaAs laser diode is amplitude modulated by modulating the injection current to said AlGaAs laser diode to produce an amplitude modulation of said 459 nm said third wavelength.

17. The resonator apparatus of claim 1 in which each of said simultaneously resonating two wavelengths in said resonator cavity is plane polarized, and the orientation of the polarization of each of said two wavelengths is orthogonal to the other of said two wavelengths within said resonator cavity.

18. The resonator apparatus of claim 1 in which said one region of said resonator cavity contains both of said two wavelengths arranged in a spatially collinear and spatially overlapped relationship, and further containing an other region of said resonator cavity where each of said simultaneously resonating two wavelengths is spatially separated and distinct.

19. The resonator apparatus of claim 18 in which said one region in which said both of said two wavelengths are spatially collinear and spatially overlapped contains said non-linear optical crystal for generating said third wavelength by sum frequency generation, said two wavelengths thereby being spatially superimposed within said non-linear optical crystal.

20. The resonator apparatus of claim 1 in which said resonator mode for each of said simultaneously resonating two wavelengths is collimated in one region of said resonator cavity, and further containing another region in said resonator cavity in which said resonator mode for each of said simultaneously resonating two wavelengths is focused.

21. The resonator apparatus of claim 1 in which said resonator mode between said output coupler reflective element and one of said two highly reflective concave fold mirror elements is a nearly concentric resonator mode with said nonlinear optical crystal located at the resonator mode waist of said nearly concentric resonator mode.

22. The resonator apparatus of claim 1 in which the emission from said means for optically exciting said laser gain element in said end pumping mode is focused onto an exterior face of said laser gain element so that the focus size of said optical emission from said means for optically exciting said laser gain element is approximately the same as the resonator mode waist at said exterior face, and the divergence of the focused optical emission from said means for optically exciting said laser gain element within said laser gain element is approximately the same as the divergence of said resonator mode within said laser gain element.

23. The resonator apparatus of claim 1 in which the finesse is high for said optical emission injected into said resonator cavity by said laser source; and further containing a piezo-electric actuator connected to a feedback loop to continuously adjust the feedback path length for said optical emission injected into said resonator cavity to maintain said feedback path length equal to a constant, integral number of wavelengths at the wavelength of said optical emission.

24. The resonator apparatus of claim 1 further containing an etalon disposed in said resonator cavity for narrowing the line width of one of said simultaneously resonating two wavelengths in said resonator cavity.

25. The resonator apparatus of claim 1 further including:
an optical amplifier, said optical amplifier being disposed to receive said optical emission injected into said resonator cavity from said laser source, and aligned to produce an amplified resonator mode for said optical emission in said resonator cavity.

26. The resonator apparatus of claim 25 in which said optical emission is a cw emission and said amplified resonator mode is amplitude modulated by modulating the excitation source for said optical amplifier.

27. The resonator apparatus of claim 26 in which said optical amplifier in said resonator cavity is a semiconductor optical amplifier containing AR coatings on both end facets and producing a modulated amplification of said optical emission by amplitude modulating the injection current to said semiconductor optical amplifier.

28. The resonator apparatus of claim 1 in which said beam combining element is a Brewster angle dispersing prism.

29. The resonator apparatus of claim 28 in which each of said simultaneously resonating two wavelengths is plane polarized and the orientation of the polarization of each of said simultaneously resonating two wavelengths is parallel to the other of said two wavelengths in one region of said resonator cavity, and, further including:
means disposed in said resonator cavity for rotating the polarization of one of said two wavelengths 90° with respect to the other of said two wavelengths, said means for rotating is disposed to effect a polarization rotation within said nonlinear optical crystal but not in said laser gain element.

30. The resonator apparatus of claim 29 in which said polarization rotating means is a multiple order wave plate.

31. The resonator apparatus of claim 30 in which each of said two wavelengths is plane polarized and the orientation of the polarization of each of said two wavelengths is parallel to the other of said two wavelengths within said Brewster angle dispersing prism.

32. The resonator apparatus of claim 28 in which said Brewster angle dispersing prism is oriented in a minimum deviation configuration, and oriented further to provide substantial dispersion for said two wavelengths to produce spatially separate and spatially distinct feedback paths for each of said two wavelengths in a region of said resonator cavity.

33. The resonator apparatus of claim 32 in which said Brewster angle dispersing prism is highly dispersive and is composed of a Faraday rotator glass.

34. The resonator apparatus of claim 33 in which said Brewster angle dispersing prism is composed of SF 55 glass.

35. The resonator apparatus of claim 1 further containing:
polarization means to polarize one of said two wavelengths in a plane polarized manner, and further orienting the polarization of each of said two wavelengths to be orthogonal to the other of said two wavelengths within said resonator cavity.

36. The resonator apparatus of claim 1 in which said nonlinear optical crystal is non-critically phase matched for sum frequency generation of said two wavelengths within said preselected range of wavelengths.

37. The resonator apparatus of claim 1 in which said simultaneously resonating two wavelengths resonate in the lowest order transverse spatial mode.

38. The resonator apparatus of claim 1 in which said means disposed to effect an amplitude modulation is a means for periodically interrupting said optical emission from said laser source for injecting said laser emission into said resonator cavity.

39. The resonator apparatus of claim 38 in which said means for periodically interrupting said optical emission is a shutter, said shutter being selected from a group of devices which includes opto-mechanical, electro-optical and acousto-optical shutters.

40. The resonator apparatus of claim 1 in which said optical means for exciting said laser gain element is a cw optical means and said laser source for injecting said optical emission into said resonator cavity is a cw laser source, and said means disposed to effect said amplitude modulation is a means for periodically interrupting the emission of said third wavelength produced by sum frequency generation from said resonator apparatus.

41. The resonator apparatus of claim 40 in which said means for periodically interrupting said emission of said third wavelength is a shutter, said shutter being selected from a group of devices which includes opto-mechanical, electro-optical and acousto-optical shutters.

42. A resonator apparatus simultaneously resonating two wavelengths and producing an amplitude modulated third wavelength by sum frequency generation comprising:
a resonator having two reflective elements arranged to form a reflective path in a resonator cavity for a resonator mode of said simultaneously resonating two wavelengths;
a laser gain element disposed in said resonator producing laser emission including one of said two wavelengths;
means disposed for optically exciting said laser gain element to produce said laser emission;
a laser source disposed to inject an optical emission including the other of said two wavelengths into said resonator cavity to resonate therein;
a nonlinear optical crystal located within said resonator cavity having the property to generate said third wavelength, said third wavelength being the sum frequency of said two wavelengths; and
means disposed for effecting an amplitude modulation of said third wavelength at a modulation frequency in the range between 0 Hz and 10 GHz.

43. The resonator apparatus of claim 42 further including:
a beam combining element disposed in said resonator cavity to combine said simultaneously resonating two wavelengths in one region of said resonator cavity and to disperse said simultaneously resonating two wavelengths, each along a separate path in another region of said resonator cavity.

44. The resonator apparatus of claim 42 in which said means for optically exciting is disposed to excite said laser gain element in an end pumping mode.

45. The resonator apparatus of claim 42 in which said one of said two wavelengths is approximately 1.3 $\mu$m, said other of said two wavelengths is approximately 659 nm and said third wavelength is approximately 439 nm.

46. The resonator apparatus of claim 42 in which said one of said two wavelengths is approximately 1 $\mu$m, said other of said two wavelengths is approximately 800 nm and said third wavelength is approximately 459 nm.

47. The resonator apparatus of claim 42 further including:
means for producing a narrow bandwidth output.

48. The resonator apparatus of claim 42 in which the emission of said other of said two wavelengths by said laser source is amplitude modulated by modulating the injection current to said laser source to create said amplitude modulated third wavelength.

* * * * *